US012617492B1

(12) United States Patent
Lin et al.

(10) Patent No.: US 12,617,492 B1
(45) Date of Patent: May 5, 2026

(54) ELECTRONIC DERAILLEUR

(71) Applicant: TIEN HSIN INDUSTRIES CO., LTD., Taichung City (TW)

(72) Inventors: Shang-Feng Lin, Taichung City (TW); Chang-Chun Kao, Taichung City (TW); Ruei-Yo Lin, Taichung City (TW)

(73) Assignee: TIEN HSIN INDUSTRIES CO., LTD., Taichung City (TW)

( * ) Notice: Subject to any disclaimer, the term of this patent is extended or adjusted under 35 U.S.C. 154(b) by 0 days.

(21) Appl. No.: 19/064,674

(22) Filed: Feb. 26, 2025

(51) Int. Cl.
B62M 9/122 (2010.01)
(52) U.S. Cl.
CPC .................................... B62M 9/122 (2013.01)
(58) Field of Classification Search
CPC ....................................................... B62M 9/122
See application file for complete search history.

(56) References Cited

U.S. PATENT DOCUMENTS

| | | | | |
|---|---|---|---|---|
| 7,290,458 B2 * | 11/2007 | Fukuda | .................. | B62M 25/08 74/82 |
| 7,704,173 B2 * | 4/2010 | Ichida | .................... | B62M 9/132 474/82 |
| 8,066,597 B2 * | 11/2011 | Sakaue | .................. | B62M 9/122 474/82 |
| 9,802,669 B2 * | 10/2017 | Jordan | ..................... | B62J 45/41 |
| 10,040,499 B2 * | 8/2018 | Hara | .......................... | B62J 1/08 |
| 10,189,542 B2 * | 1/2019 | Wu | ...................... | B62M 9/1242 |
| 10,894,574 B2 * | 1/2021 | Brown | ................... | B62M 9/128 |
| 10,981,625 B2 * | 4/2021 | Brown | .................... | B62M 1/36 |
| 11,015,705 B2 * | 5/2021 | Ho | ......................... | B62K 23/02 |
| 11,021,214 B2 * | 6/2021 | Ho | .......................... | B62M 25/08 |
| 11,230,349 B2 * | 1/2022 | Liao | ...................... | B62M 9/132 |
| 11,312,449 B2 * | 4/2022 | Dueweling | ........... | B62M 9/122 |
| 11,319,020 B2 * | 5/2022 | Liao | ...................... | B62M 9/125 |
| 11,427,282 B2 * | 8/2022 | Sala | ...................... | B62M 9/122 |
| 11,428,279 B2 * | 8/2022 | Choltco-Devlin | ...... | F16D 41/12 |
| 11,459,061 B2 * | 10/2022 | Ho | .......................... | B62J 43/30 |
| 11,472,509 B2 * | 10/2022 | Sala | ...................... | B62M 9/125 |
| 11,498,644 B2 * | 11/2022 | Sala | .................... | B62M 9/1242 |
| 11,535,339 B2 * | 12/2022 | Ichida | ................... | B62M 25/08 |
| 11,560,199 B2 * | 1/2023 | Rodgers | ................ | B62M 9/122 |
| 11,560,200 B2 * | 1/2023 | Sala | .......................... | H02J 7/02 |
| 11,565,771 B2 * | 1/2023 | Boehm | .................. | B62M 25/08 |

(Continued)

*Primary Examiner* — Henry Y Liu
(74) *Attorney, Agent, or Firm* — Apex Juris, pllc; Cera Oh

(57) ABSTRACT

An electronic derailleur mounted on a frame of a bicycle includes a base portion for connecting to the frame, a movable portion, a first linkage, a second linkage, four pivot shafts, and a battery unit. The movable portion is movable relative to the base portion. Both the first linkage and the second linkage are pivotally connected to the base portion and the movable portion. The base portion, the movable portion, the first linkage, and the second linkage are pivotally connected as a four-bar linkage for moving the movable portion relative to the base portion. The pivot shafts are disposed between the base portion and the second linkage, between the second linkage and the movable portion, between the movable portion and the first linkage, and between the first linkage and the base portion, respectively. One of the pivot shafts has a battery cavity for housing the battery unit.

11 Claims, 10 Drawing Sheets

(56) References Cited

U.S. PATENT DOCUMENTS

| | | | | |
|---|---|---|---|---|
| 11,618,532 B2* | 4/2023 | Jordan | B62M 25/08 | 474/80 |
| 11,661,139 B2* | 5/2023 | Jordan | B62M 9/132 | 474/80 |
| 11,667,350 B2* | 6/2023 | Chang | B62M 9/1244 | 474/82 |
| 11,685,470 B2* | 6/2023 | Shahana | B62J 43/28 | 701/58 |
| 11,697,474 B2* | 7/2023 | Fujimoto | B62M 9/132 | 474/82 |
| 11,713,095 B2* | 8/2023 | Shipman | B62M 9/1242 | 474/80 |
| 11,731,732 B2* | 8/2023 | Shipman | B62M 9/122 | 474/160 |
| 11,731,733 B2* | 8/2023 | Dueweling | B62M 9/122 | 474/80 |
| 11,753,106 B2* | 9/2023 | Wesling | B62M 9/132 | 474/82 |
| 11,753,109 B2* | 9/2023 | Pasqua | B62M 9/122 | 474/82 |
| 11,780,532 B2* | 10/2023 | Braedt | B62M 9/122 | 474/80 |
| 11,787,504 B2* | 10/2023 | Hamed | B62M 9/122 | 474/80 |
| 11,787,507 B2* | 10/2023 | Ho | H04W 76/14 | 701/49 |
| 11,840,315 B2* | 12/2023 | Hahn | B62M 9/126 | |
| 11,845,515 B2* | 12/2023 | Boehm | B62M 9/1242 | |
| 11,866,127 B2* | 1/2024 | Boehm | B62M 9/125 | |
| 11,873,059 B2* | 1/2024 | Sala | B62M 9/128 | |
| 11,891,154 B2* | 2/2024 | Sala | B62J 45/00 | |
| 11,939,028 B2* | 3/2024 | Shahana | B62M 9/122 | |
| 11,958,568 B2* | 4/2024 | Suyama | B62M 9/1242 | |
| 12,005,994 B2* | 6/2024 | Hahn | B62M 9/122 | |
| 12,024,263 B2* | 7/2024 | Minto | B62M 9/124 | |
| 12,077,244 B2* | 9/2024 | Ichida | B62M 25/08 | |
| 12,084,146 B2* | 9/2024 | Komada | B60L 50/20 | |
| 12,103,640 B2* | 10/2024 | Hahn | B62M 9/133 | |
| 12,116,085 B1* | 10/2024 | Suyama | B60L 53/80 | |
| 12,145,694 B2* | 11/2024 | Sala | B62M 9/1248 | |
| 12,240,555 B2* | 3/2025 | Navarro Baeza | B62K 25/02 | |
| 12,358,592 B2* | 7/2025 | Chen | B62J 43/20 | |
| 12,375,872 B2* | 7/2025 | Sessions | H04W 4/023 | |
| 12,428,104 B2* | 9/2025 | Boehm | B62M 9/122 | |
| 12,459,594 B2* | 11/2025 | Lin | B62K 3/00 | |
| 12,485,995 B2* | 12/2025 | Dueweling | B62M 9/123 | |
| 12,509,182 B2* | 12/2025 | Braedt | B62M 9/122 | |
| 2005/0187050 A1* | 8/2005 | Fukuda | B62M 25/08 | 474/82 |
| 2007/0184925 A1* | 8/2007 | Ichida | B62M 25/08 | 474/80 |
| 2008/0227572 A1* | 9/2008 | Sakaue | B62M 9/122 | 474/82 |
| 2014/0087901 A1* | 3/2014 | Shipman | B62M 9/122 | 429/100 |
| 2014/0323254 A1* | 10/2014 | Kuwayama | B62M 9/12 | 474/80 |
| 2015/0111675 A1* | 4/2015 | Shipman | B62M 9/122 | 474/82 |
| 2016/0221640 A1* | 8/2016 | Watarai | B62M 9/122 | |
| 2016/0339986 A1* | 11/2016 | Jordan | G08C 17/02 | |
| 2017/0096185 A1* | 4/2017 | Hara | B62J 1/08 | |
| 2017/0113759 A1* | 4/2017 | Watarai | B62J 43/30 | |
| 2017/0174289 A1* | 6/2017 | Wu | B62M 9/16 | |
| 2017/0197685 A1* | 7/2017 | Braedt | B62M 9/122 | |
| 2018/0257736 A1* | 9/2018 | Komatsu | B62J 45/41 | |
| 2018/0257737 A1* | 9/2018 | Komatsu | B62K 25/10 | |
| 2018/0274623 A1* | 9/2018 | Brown | F16F 9/10 | |
| 2019/0100279 A1* | 4/2019 | Brown | B62M 9/127 | |
| 2019/0100280 A1* | 4/2019 | Brown | B62M 1/36 | |
| 2019/0144071 A1* | 5/2019 | Boehm | B62M 9/1242 | 474/80 |
| 2019/0300111 A1* | 10/2019 | Liao | B62M 9/122 | |
| 2019/0300112 A1* | 10/2019 | Liao | B62M 9/1242 | |
| 2019/0315435 A1* | 10/2019 | Jordan | B62M 9/124 | |
| 2019/0351971 A1* | 11/2019 | Dueweling | B62M 9/122 | |
| 2020/0156735 A1* | 5/2020 | Jordan | B62M 9/124 | |
| 2020/0166089 A1* | 5/2020 | Choltco-Devlin | F16D 41/12 | |
| 2020/0189688 A1* | 6/2020 | Rodgers | B62M 9/1242 | |
| 2020/0223513 A1* | 7/2020 | Ho | B62M 25/04 | |
| 2020/0231249 A1* | 7/2020 | Ho | B62K 23/06 | |
| 2020/0247504 A1* | 8/2020 | Ho | H04W 76/14 | |
| 2020/0262516 A1* | 8/2020 | Hahn | B62M 9/122 | |
| 2020/0339220 A1* | 10/2020 | Boehm | B62M 9/122 | |
| 2020/0346714 A1* | 11/2020 | Hahn | B62M 9/122 | |
| 2021/0061413 A1* | 3/2021 | Ichida | B62M 25/08 | |
| 2021/0070397 A1* | 3/2021 | Komada | B62M 9/132 | |
| 2021/0129937 A1* | 5/2021 | Sala | H02J 7/02 | |
| 2021/0129938 A1* | 5/2021 | Sala | B62M 9/1242 | |
| 2021/0129939 A1* | 5/2021 | Sala | B62M 9/128 | |
| 2021/0129940 A1* | 5/2021 | Sala | B62J 45/413 | |
| 2021/0284284 A1* | 9/2021 | Ho | B62L 3/02 | |
| 2021/0324934 A1* | 10/2021 | Brown | B62M 9/128 | |
| 2021/0394865 A1* | 12/2021 | Wesling | B62M 25/08 | |
| 2022/0063763 A1* | 3/2022 | Braedt | B62M 9/122 | |
| 2022/0194509 A1* | 6/2022 | Navarro Baeza | B62K 25/02 | |
| 2022/0212753 A1* | 7/2022 | Dueweling | B62M 9/123 | |
| 2022/0371681 A1* | 11/2022 | Lin | B62K 3/00 | |
| 2022/0371688 A1* | 11/2022 | Lin | B62L 3/02 | |
| 2022/0388602 A1* | 12/2022 | Hahn | B62M 9/132 | |
| 2022/0388603 A1* | 12/2022 | Hahn | B62M 9/123 | |
| 2022/0389979 A1* | 12/2022 | Choltco-Devlin | F16D 41/12 | |
| 2022/0411017 A1* | 12/2022 | Braedt | B62M 9/122 | |
| 2023/0090059 A1* | 3/2023 | Ichida | B62M 25/08 | 474/80 |
| 2023/0093851 A1* | 3/2023 | De Poli | B62J 43/20 | 474/80 |
| 2023/0094161 A1* | 3/2023 | Sala | H02J 7/02 | 474/80 |
| 2023/0099532 A1* | 3/2023 | Pasqua | B62M 9/122 | 474/82 |
| 2023/0101681 A1* | 3/2023 | Minto | B62J 43/30 | 280/288.4 |
| 2023/0108196 A1* | 4/2023 | Shahana | B62M 9/132 | 701/58 |
| 2023/0108777 A1* | 4/2023 | Sala | H02J 7/02 | 474/80 |
| 2023/0109945 A1* | 4/2023 | Garnica | B62J 45/20 | 701/51 |
| 2023/0112226 A1* | 4/2023 | De Poli | B62M 9/122 | 439/271 |
| 2023/0150609 A1* | 5/2023 | Boehm | B62M 9/1242 | 474/80 |
| 2023/0182860 A1* | 6/2023 | Chen | B62J 43/20 | |
| 2023/0192235 A1* | 6/2023 | Hamed | B62M 25/08 | 474/80 |
| 2023/0202609 A1* | 6/2023 | Hahn | B62J 3/14 | 701/29.1 |
| 2023/0227123 A1* | 7/2023 | Shipman | B62M 9/122 | 474/80 |
| 2023/0257063 A1* | 8/2023 | Shahana | B62J 45/20 | 701/58 |
| 2023/0278666 A1* | 9/2023 | Hamed | B62J 45/00 | 474/80 |
| 2023/0348019 A1* | 11/2023 | Dueweling | B62M 9/123 | |
| 2023/0365225 A1* | 11/2023 | Hamed | H02K 11/21 | |
| 2023/0365226 A1* | 11/2023 | Minto | G01B 7/30 | |
| 2023/0373585 A1* | 11/2023 | Ueda | B62J 43/30 | |
| 2023/0406448 A1* | 12/2023 | Braedt | B62M 9/122 | |
| 2024/0092456 A1* | 3/2024 | Suyama | B62M 9/1242 | |
| 2024/0092457 A1* | 3/2024 | Boehm | B62M 9/122 | |
| 2024/0107264 A1* | 3/2024 | Sessions | B62K 23/06 | |
| 2024/0227982 A1* | 7/2024 | Sala | B62M 9/124 | |
| 2024/0336328 A1* | 10/2024 | Suyama | H01M 50/249 | |
| 2024/0369112 A1* | 11/2024 | Choltco-Devlin | F16D 41/12 | |
| 2024/0391558 A1* | 11/2024 | Ichida | B62M 9/132 | |
| 2025/0257769 A1* | 8/2025 | Choltco-Devlin | F16D 41/12 | |
| 2025/0269931 A1* | 8/2025 | Boehm | B62M 9/122 | |
| 2025/0338079 A1* | 10/2025 | Sessions | B62J 45/41 | |

* cited by examiner

ELECTRONIC DERAILLEUR

BACKGROUND OF THE INVENTION

Technical Field

The present disclosure relates generally to a rear transmission for a bicycle, and more particularly to an electronic derailleur.

Description of Related Art

A battery of conventional electronic derailleur is usually attached directly to an external surface of a four-bar linkage. Although such arrangement is simple in structure, the battery is exposed outward and is susceptible to impact from foreign objects or external forces, resulting in damage to the battery assembly. Additionally, such arrangement increases the volume of the overall derailleur, which adversely affects the appearance and operation flexibility of the bicycle.

Therefore, how to provide an electronic derailleur that not only could effectively reduce the influence of external impacts on the battery, but also could improve the structural stability and optimize the volume configuration, is an urgent problem to be solved.

BRIEF SUMMARY OF THE INVENTION

In view of the above, the primary objective of the present disclosure is to provide an electronic derailleur, so that the influence of external impacts on a battery could be effectively reduced.

The present disclosure provides an electronic derailleur that is mounted on a frame of a bicycle and includes a base portion, configured to connect to the frame of the bicycle; a movable portion, movable relative to the base portion; a first linkage, pivotally connected to the base portion and the movable portion; a second linkage, pivotally connected to the base portion and the movable portion, wherein the base portion, the movable portion, the first linkage, and the second linkage are pivotally connected as a four-bar linkage for moving the movable portion relative to the base portion; four pivot shafts, located between the base portion and the second linkage, between the second linkage and the movable portion, between the movable portion and the first linkage, and between the first linkage and the base portion, respectively, wherein one of the pivot shafts has a battery cavity; and a battery unit, disposed in the battery cavity.

The effect of the present disclosure is that the battery unit is effectively integrated through the battery unit being disposed in the battery cavity of one of the pivot shafts, thereby effectively reducing the influence of external impacts on the battery unit.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
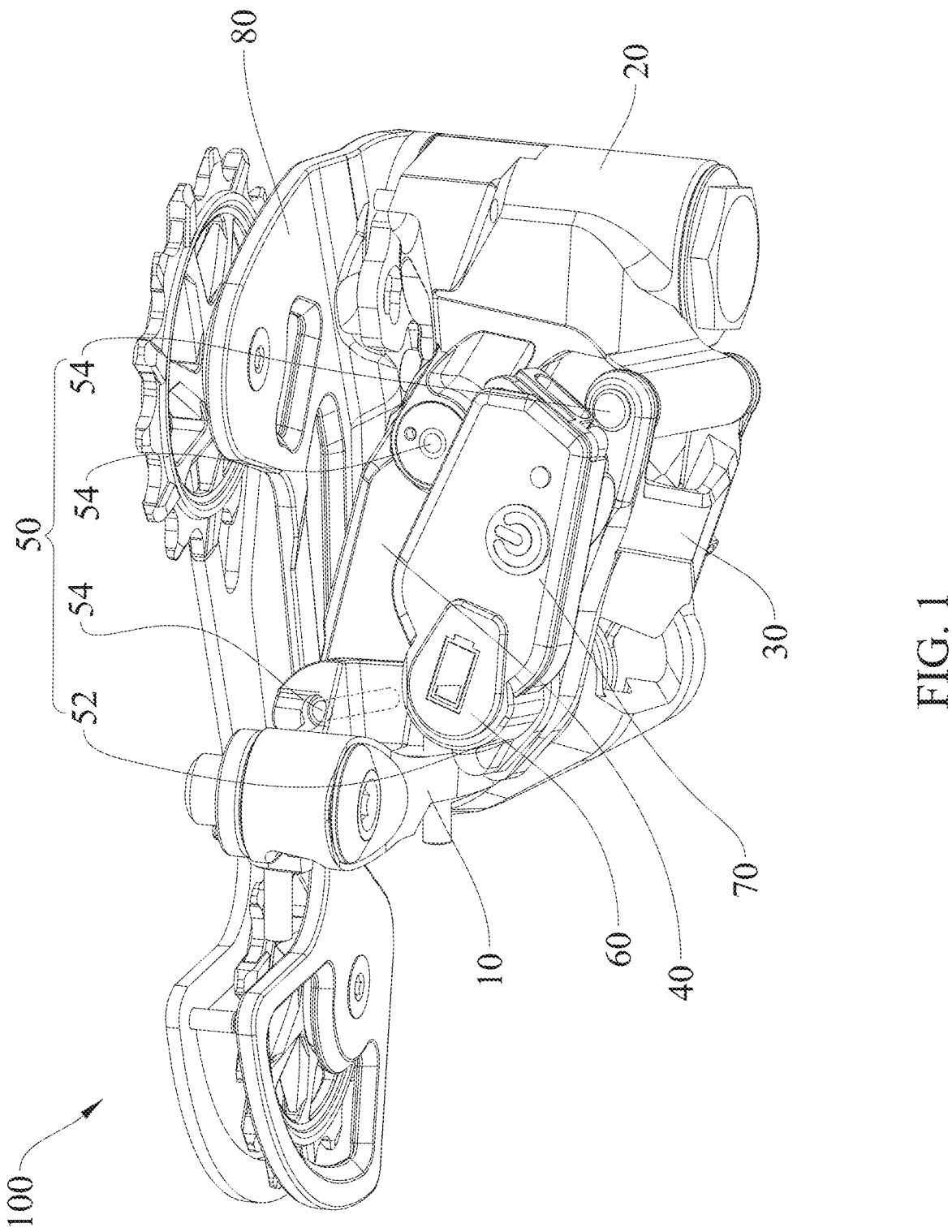
FIG. 1 is a perspective view of an electronic derailleur of an embodiment of the present disclosure.

Referring to FIG. 1, an electronic derailleur 100 of an embodiment of the present disclosure is mounted on a frame of a bicycle (not shown). The electronic derailleur 100 includes a base portion 10, a movable portion 20, a first linkage 30, a second linkage 40, four pivot shafts 50, a battery assembly 60, a control module 70, a chain guide portion 80, and a plurality of positioning members 90.

Figure 2:
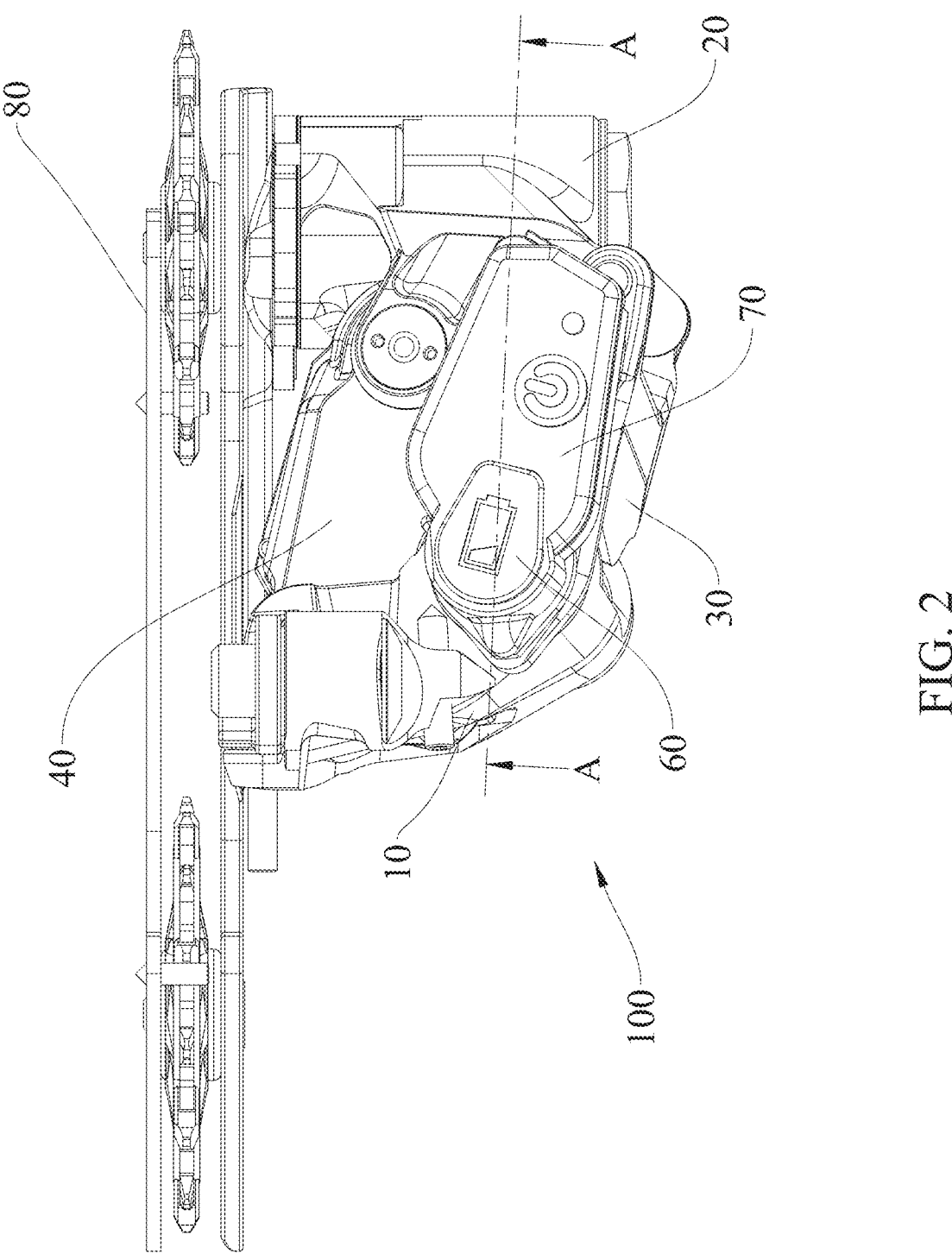
FIG. 2 is a top view of the electronic derailleur of the embodiment.

Referring to FIG. 1 and FIG. 2, the base portion 10, the movable portion 20, the first linkage 30, and the second linkage 40 are pivotally connected as a four-bar linkage. One end of the base portion 10 is configured to connect to the frame of the bicycle to provide a stable mounting point for the electronic derailleur 100. The movable portion 20 is movable relative to the base portion 10 to achieve a speed-changing function. Two ends of the first linkage 30 are pivotally connected to the base portion 10 and the movable portion 20 respectively, and two ends of the second linkage 40 are pivotally connected to the base portion 10 and the movable portion 20 respectively, so that the movable portion 20 is movable relative to the base portion 10. The second linkage 40 is closer to the frame than the first linkage 30.

Figure 3:
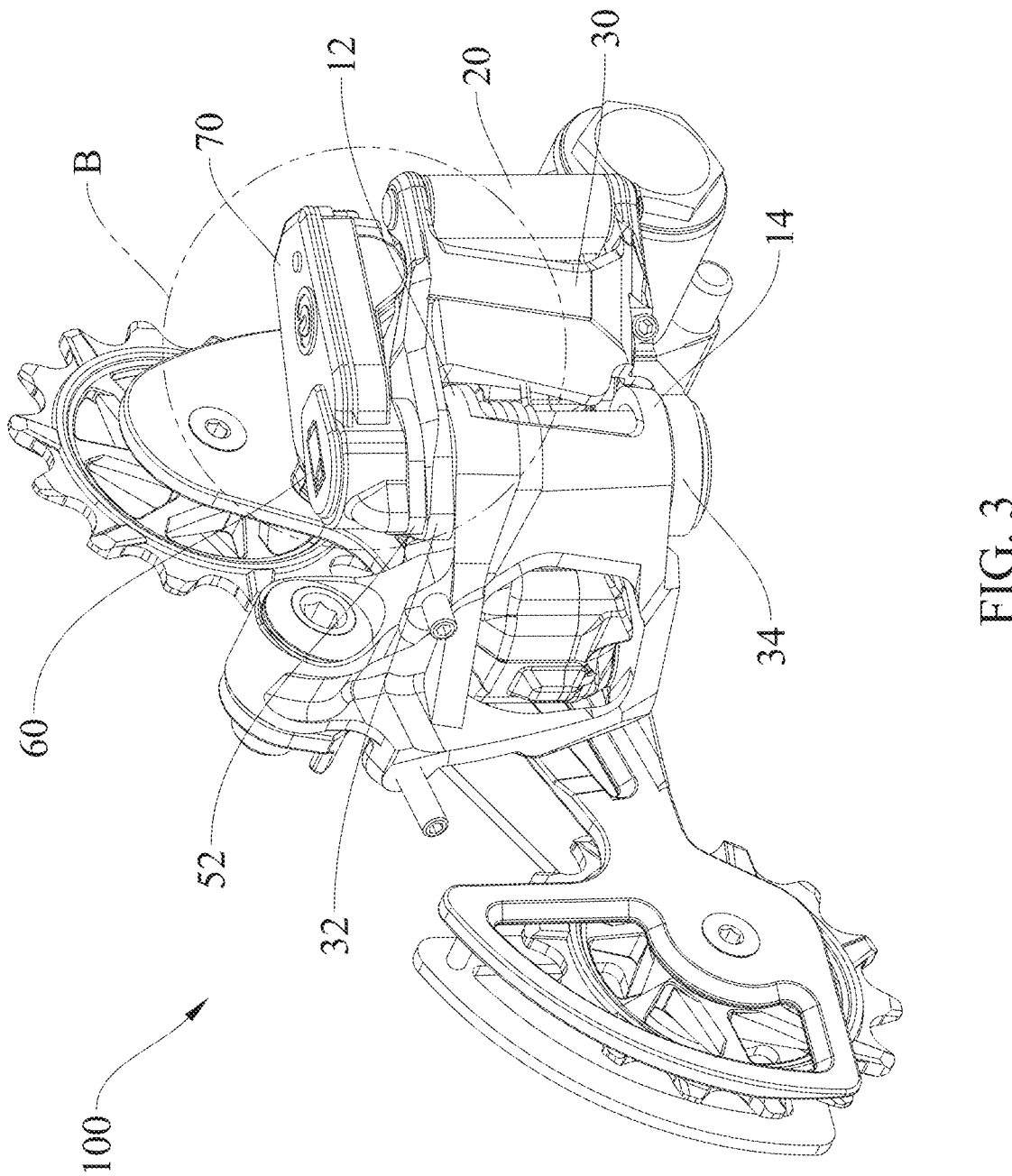
FIG. 3 is a perspective view of the electronic derailleur of the embodiment from another perspective.

As shown in FIG. 3, a first pivoting ring 12 and a second pivoting ring 14 are disposed coaxially at one end of the base portion 10 adjacent to the first linkage 30, and the first pivoting ring 12 is located above the second pivoting ring 14.

As shown in FIG. 3, a third pivoting ring 32 and a fourth pivoting ring 34 are disposed coaxially at one end of the first linkage 30 adjacent to the base portion 10, and the third pivoting ring 32 is located above the fourth pivoting ring 34. The third pivoting ring 32 is disposed above the first pivoting ring 12, and the second pivoting ring 14 is disposed above the fourth pivoting ring 34.

As shown in FIG. 1, the four pivot shafts 50 are located between the base portion 10 and the second linkage 40, between the second linkage 40 and the movable portion 20, between the movable portion 20 and the first linkage 30, and between the first linkage 30 and the base portion 10, respectively. In this way, the pivot shafts 50 could provide rotational support between the linkages to ensure the stability and flexibility in motion of the overall mechanism.

As shown in FIG. 1, FIG. 5, FIG. 6, and FIG. 9, the pivot shafts 50 are a first pivot shaft 52 and three second pivot shafts 54. The first pivot shaft 52 is defined as a tubular structure having a battery cavity 522.

Figure 9:
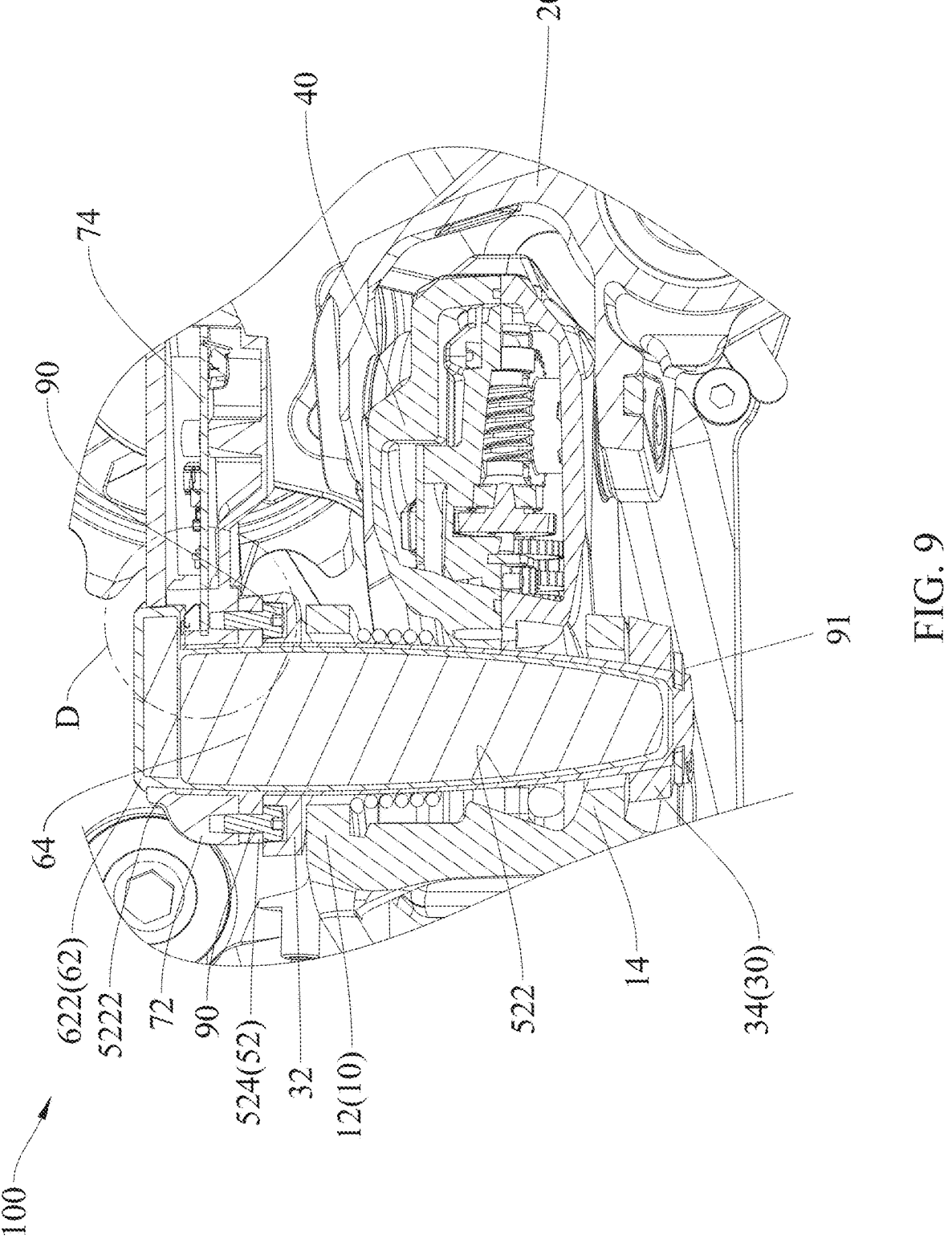
FIG. 9 is a sectional view in the A-A line in FIG. 2.

As shown in FIG. 3 and FIG. 9, the first pivot shaft 52 is located between the first linkage 30 and the base portion 10, and the first pivot shaft 52 is disposed in the first pivoting ring 12, the second pivoting ring 14, the third pivoting ring 32, and the fourth pivoting ring 34, thereby achieving a stable support and a flexible rotary connection.

In the embodiment, the first pivot shaft 52 is located between the first linkage 30 and the base portion 10. In other embodiments, the first pivot shaft 52 could also be located between the base portion 10 and the second linkage 40, between the second linkage 40 and the movable portion 20, or between the movable portion 20 and the first linkage 30 to meet different mechanism needs.

Figure 6:
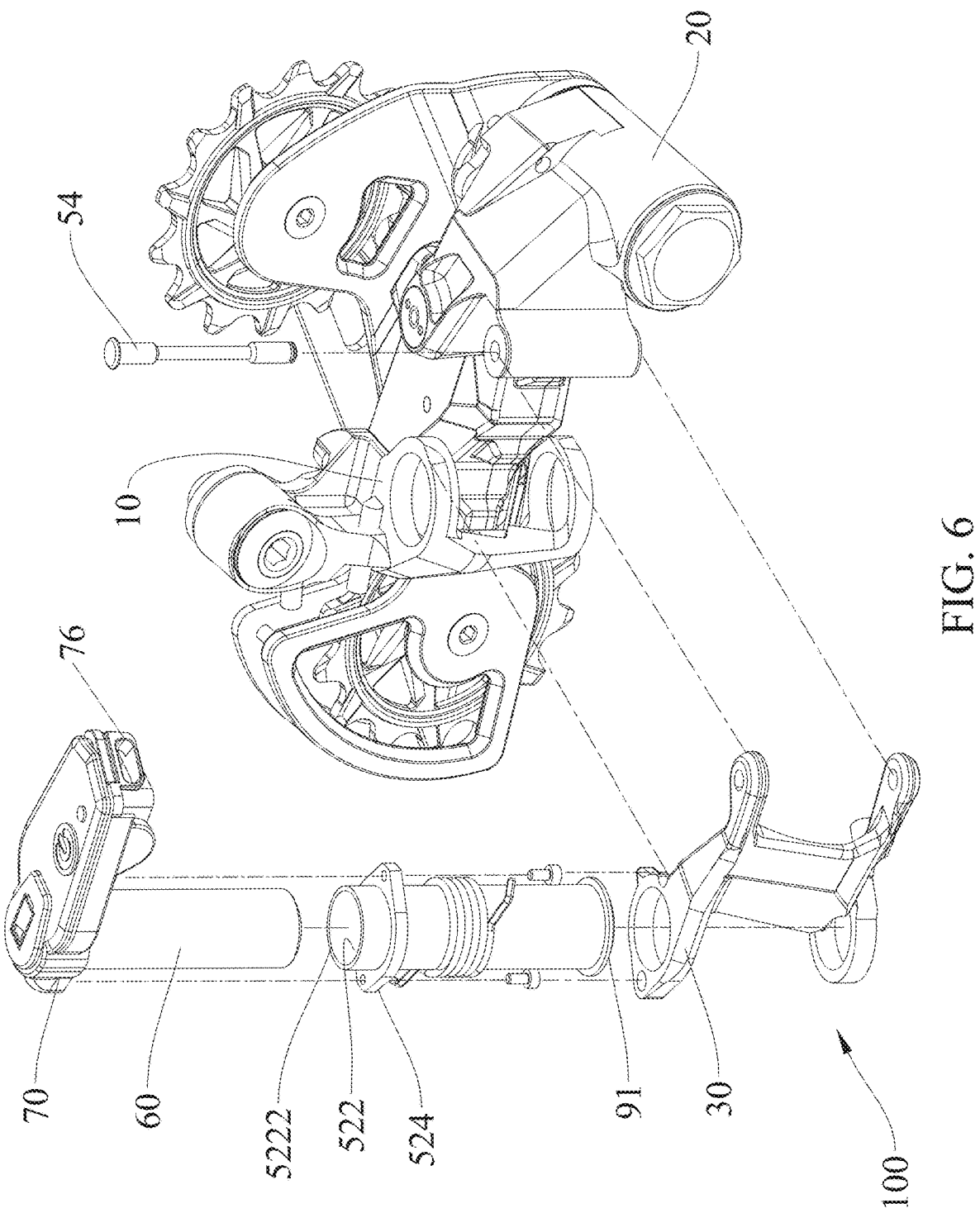
FIG. 6 is another partially exploded view of the electronic derailleur of the embodiment.

As shown in FIG. 6 and FIG. 9, the first pivot shaft 52 includes the battery cavity 522 and a positioning portion 524. The battery cavity 522 is formed inside the first pivot shaft 52, and the battery cavity 522 has an opening 5222 for housing the battery assembly 60. In this way, not only the support and rotation functions between the first linkage 30 and the base portion 10 are provided, but also the effective integration of the battery assembly 60 is achieved, thereby simplifying the mechanical structure, enhancing the efficiency of space utilization, and effectively reducing the influence of external impacts on the battery assembly 60.

Figure 7:
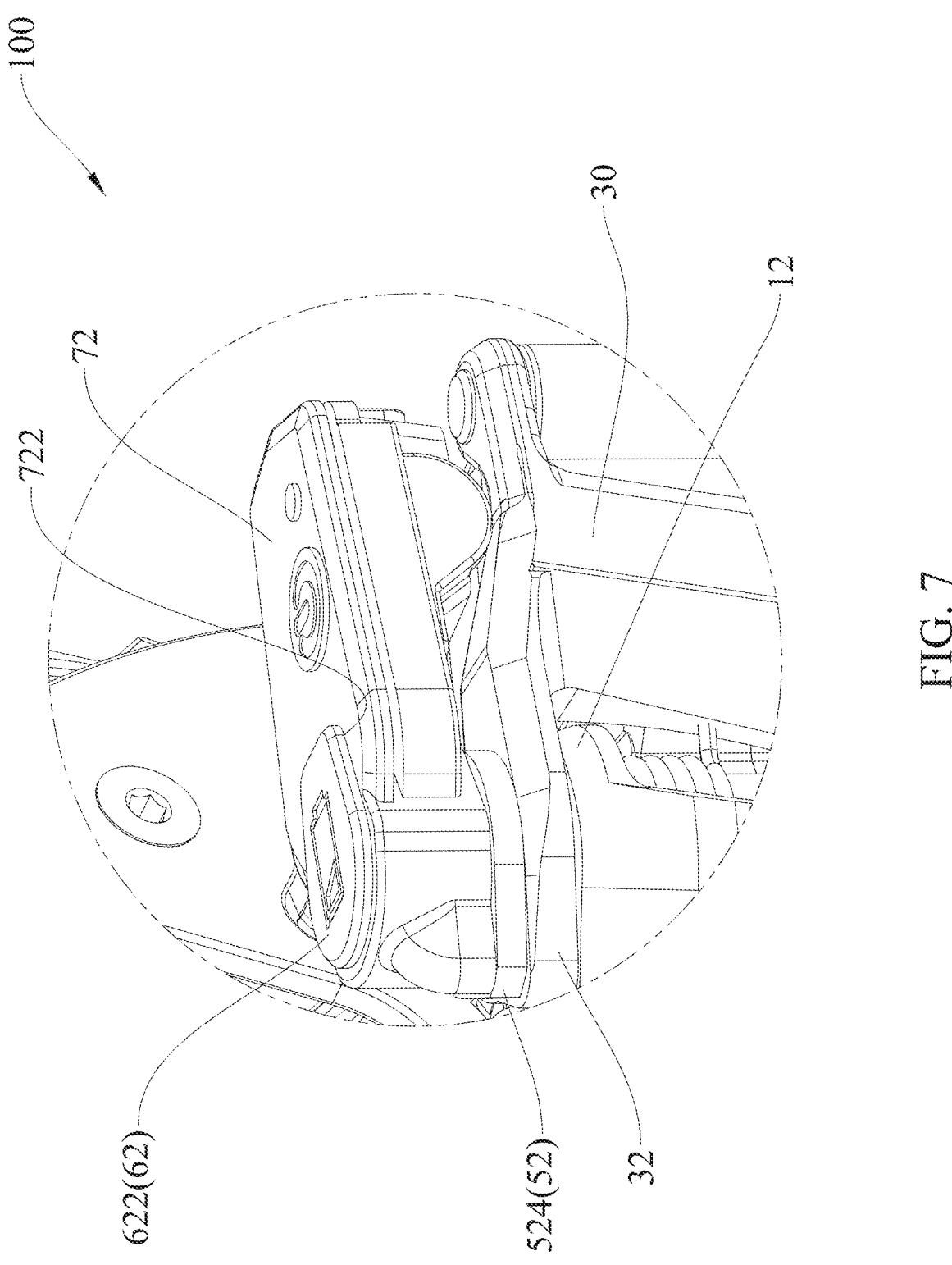
FIG. 7 is an enlarged schematic view of a marked region B in FIG. 3.
Figure 8:
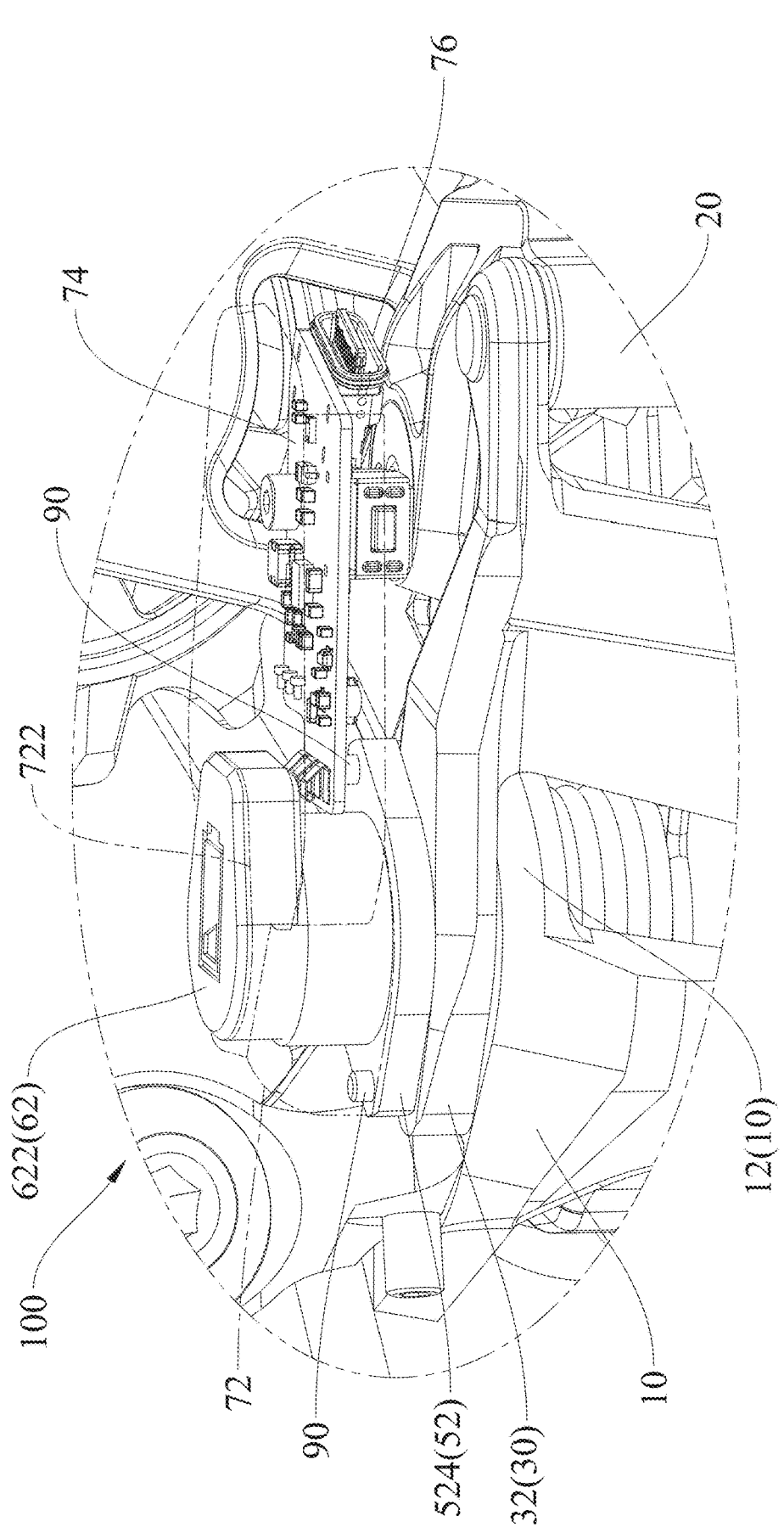
FIG. 8 is an enlarged schematic view of a marked region C in FIG. 4, wherein the casing is presented in broken lines to show components inside the casing of the control module.

As shown in FIG. 7 to FIG. 9, the positioning portion 524 is a protruding ring disposed on an outer surface of the first pivot shaft 52, and the positioning portion 524 is disposed above the third pivoting ring 32.

Figure 10:
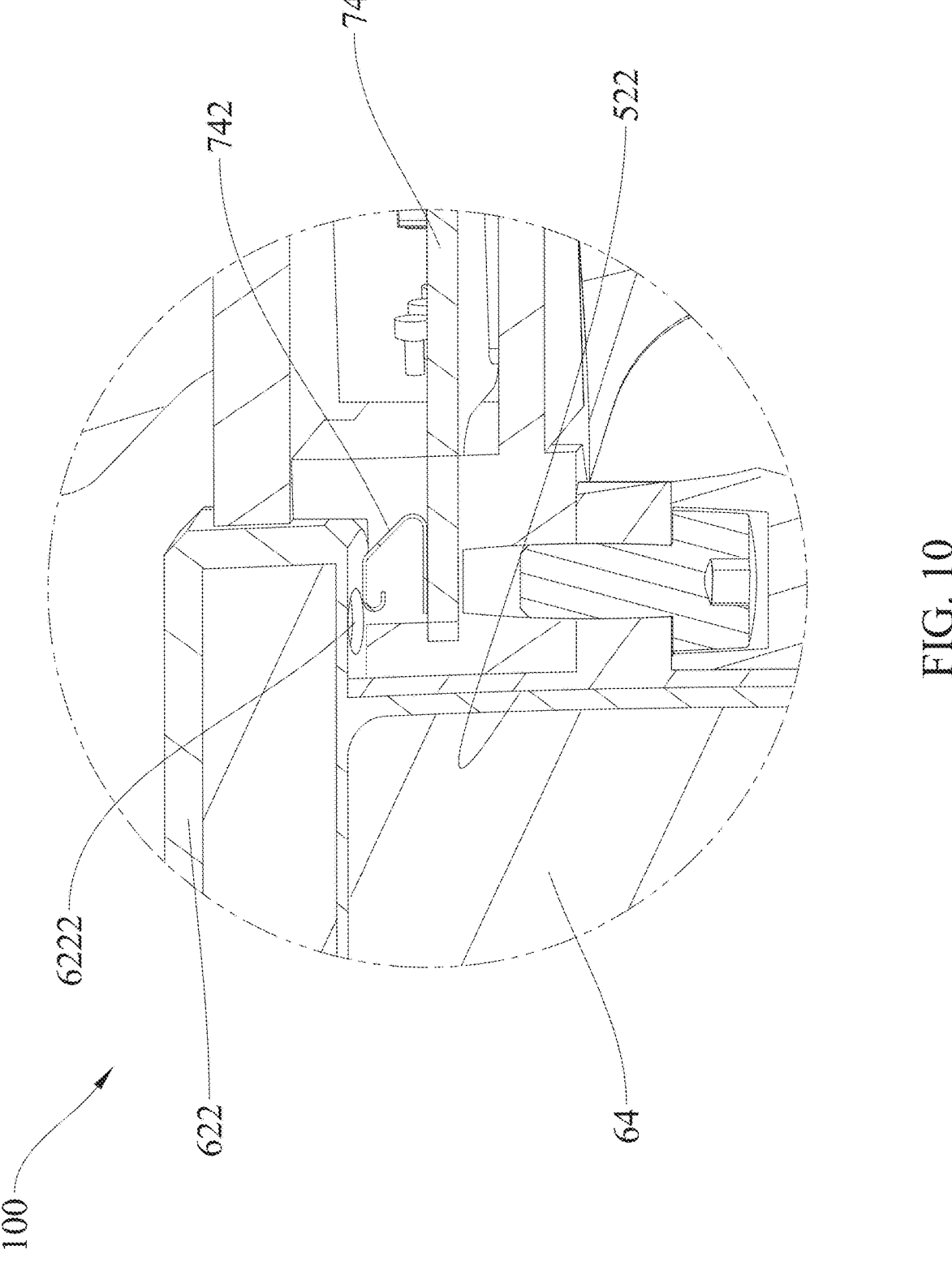
FIG. 10 is an enlarged schematic view of a marked region D in FIG. 9.

As shown in FIG. 9, the battery assembly 60 includes a battery housing 62 and a battery unit 64. The battery housing 62 is disposed in the battery cavity 522 of the first pivot shaft 52. The battery unit 64 is disposed in the battery housing 62. As shown in FIG. 7 to FIG. 9, one end of the battery housing 62 has an end cap 622 protruding from the opening 5222 of the battery cavity 522. As shown in FIG. 10, the end cap 622 has a terminal opening 6222 disposed on a bottom surface of the end cap 622 for a terminal (not shown) of the battery unit 64 to be exposed outward, thereby achieving an electrical connection with external circuits. In this way, secure protection for the battery unit 64 could be provided, the stable connection between the battery unit 64 and the external circuits could be ensured, and convenient operation could be achieved.

Figure 4:
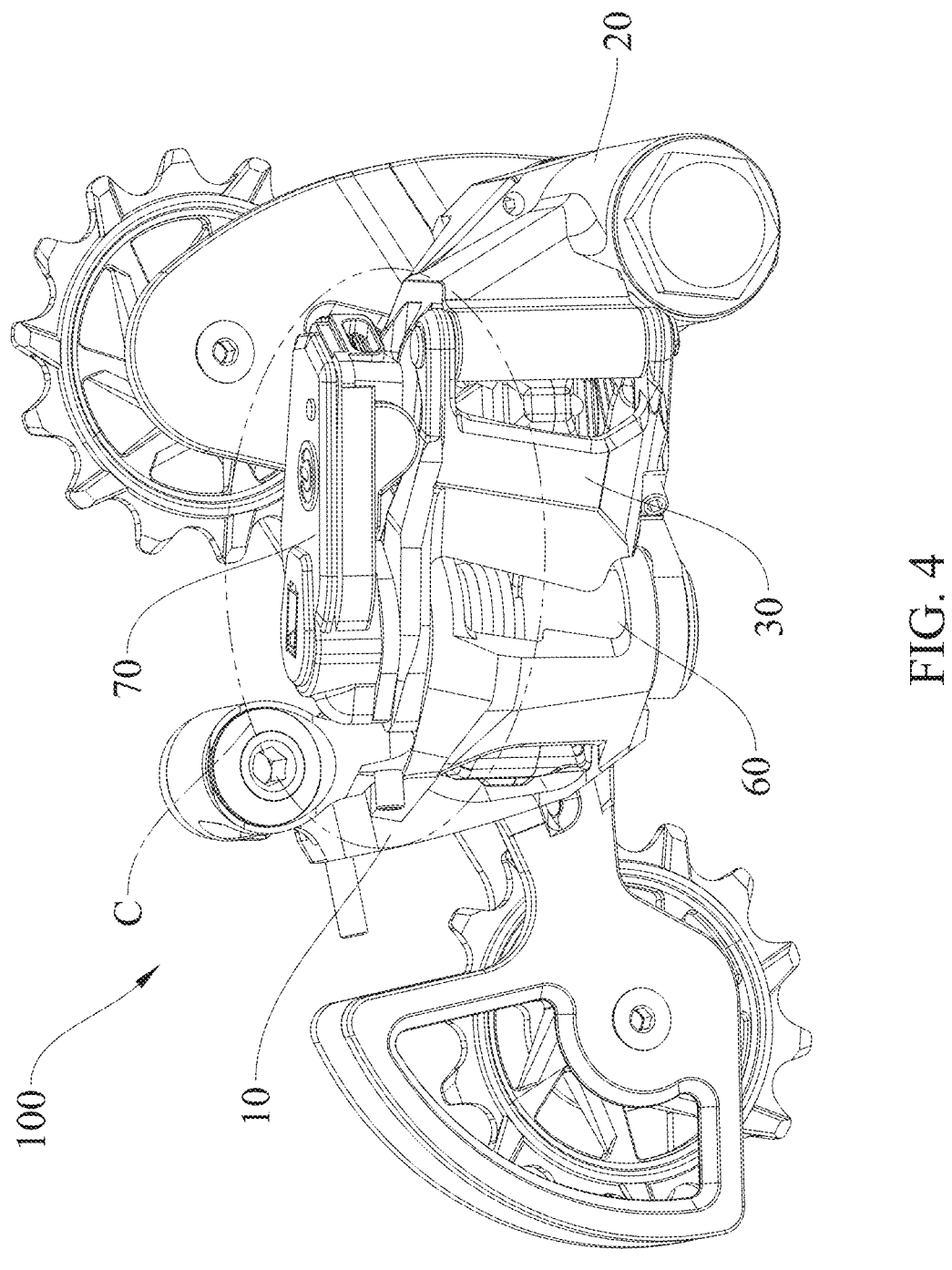
FIG. 4 is a perspective view of the electronic derailleur of the embodiment from another perspective.
Figure 5:
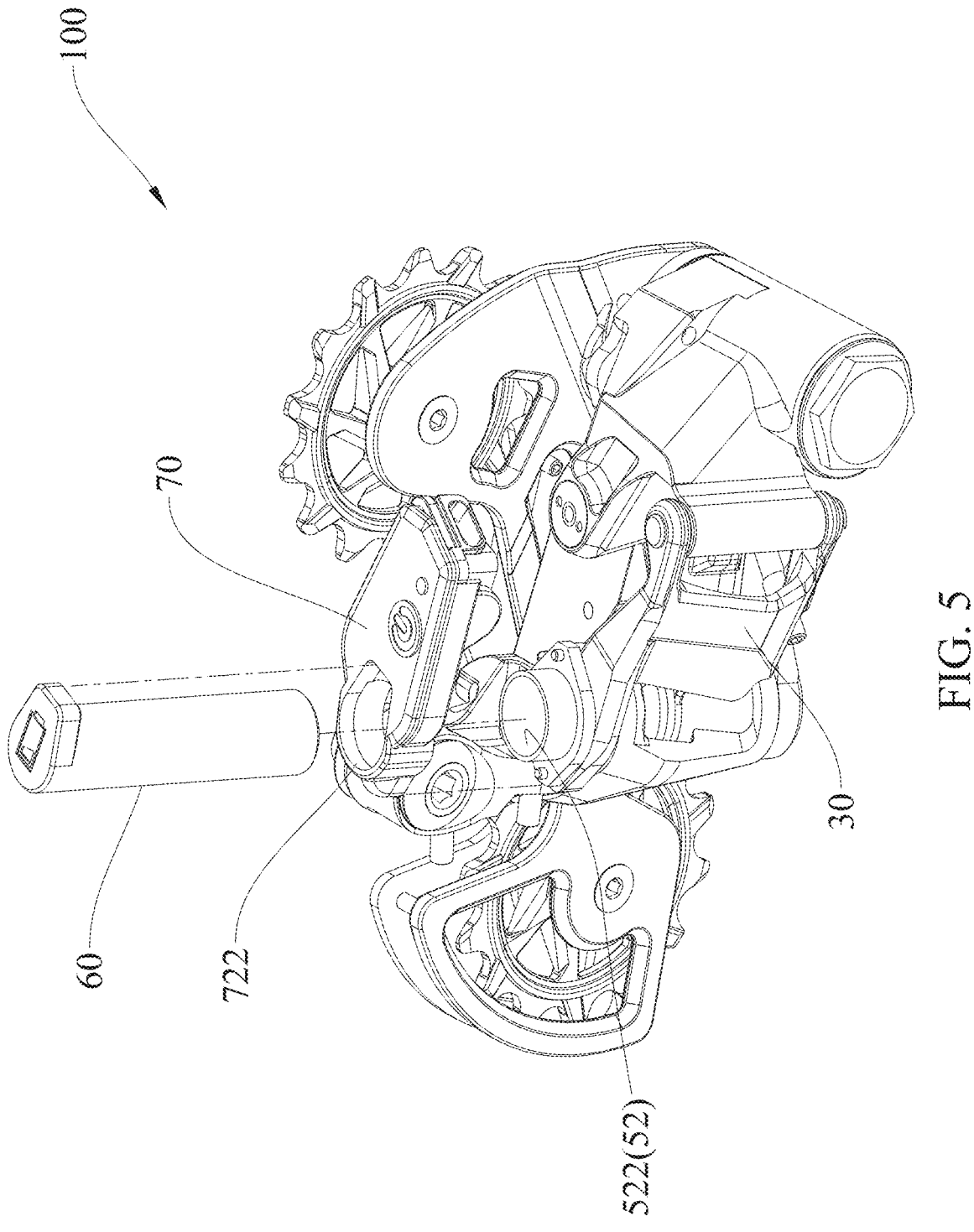
FIG. 5 is a partially exploded view of the electronic derailleur of the embodiment.

As shown in FIG. 4, FIG. 7, and FIG. 8, the control module 70 includes a casing 72, a circuit board 74, and a charging interface 76. The casing 72 extends in an extension direction of the first linkage 30. One end of the casing 72 is disposed above the positioning portion 524 of the first pivot shaft 52. The end of the casing 72 has a perforation 722, and the end cap 622 of the battery housing 62 is secured in the perforation 722. In this way, the control module 70 and the battery assembly 60 are fixed to each other.

As shown in FIG. 8 to FIG. 10, the casing 72 encases a circuit board 74, and one end of the circuit board 74 is provided with a contact 742 for being electrically connected to the terminal of the battery unit 64. Since the circuit board 74 is located at one end of the battery assembly 60, a current conduction path is shortened, thereby effectively reducing current loss and further enhancing electrical energy transmission efficiency and overall system performance.

As shown in FIG. 8 and FIG. 9, one end of the charging interface 76 is electrically connected to one end of the circuit board 74 away from the contact 742, and another end of the charging interface 76 passes through the casing 72 to be exposed outward for charging an external device. Since the charging interface 76 is located adjacent to the battery assembly 60, a current transmission distance is effectively shortened, thereby reducing current loss and further enhancing charging efficiency and system performance.

As shown in FIG. 1 and FIG. 2, the chain guide portion 80 is pivotally connected to the movable portion 20 and is movable relative to the base portion 10 along with the movable portion 20. Since the movable portion 20 and the chain guide portion 80 are movable relative to the base portion 10, a chain of the bicycle (not shown) could be moved from one sprocket (not shown) to another sprocket (not shown), thereby achieving a smooth speed-changing function.

As shown in FIG. 6, FIG. 8, and FIG. 9, the positioning members 90 are disposed around the battery assembly 60. Each of the positioning members 90 passes sequentially through the third pivoting ring 32 of the first linkage 30, the positioning portion 524 of the first pivot shaft 52, and the casing 72 of the control module 70. In this way, the first pivot shaft 52, the first linkage 30, and the control module 70 are securely connected, and the first pivot shaft 52 and the control module 70 are kept in a fixed position relative to the first linkage 30. That is, the first pivot shaft 52 and the control module 70 are positioned at the first linkage 30. In addition, the control module 70 could be kept in a fixed position relative to the battery assembly 60 during the use of the electronic derailleur 100, thereby enabling the battery assembly 60 to stably supply power to the control module 70 and ensuring the accuracy and stability of the signal transmission.

In the embodiment, the number of the positioning members 90 is two. In other embodiments, the number of the positioning members 90 could also be one or plural.

As shown in FIG. 6 and FIG. 9, in the embodiment, the first pivot shaft 52 has a stop member 91. The stop member 91 is engaged with an outer side of the first pivot shaft 52 and located on a bottom side of the fourth pivoting ring 34 of the first linkage 30. The stop member 91 is configured to limit a displacement of the first pivot shaft 52 relative to the fourth pivoting ring 34. By the stop member 91 working with the positioning portion 524, the first pivot shaft 52 is prevented from being displaced in a longitudinal direction of the first pivot shaft 52 relative to the base portion 10 and the first linkage 30, thereby enabling the base portion 10 to be pivotally connected to the first linkage 30 through the first pivot shaft 52 more securely. In other embodiments, a position of the stop member 91 could be adjustable in the longitudinal direction of the first pivot shaft 52; the stop member 91 could be disposed on a bottom side of the first pivoting ring 12, a bottom side of the second pivoting ring 14, or a bottom side of the third pivoting ring 32 to limit a displacement of the first pivot shaft 52 relative to the first pivoting ring 12, the second pivoting ring 14, or the third pivoting ring 32. Through the stop member 91 working with the positioning portion 524, the first pivot shaft 52 could also be prevented from being displaced in the longitudinal direction of the first pivot shaft 52 relative to the base portion 10 and the first linkage 30, which further ensures the stability of the overall structure.

In the embodiment, the first pivot shaft 52 is located between the first linkage 30 and the base portion 10, and the control module 70 and the movable portion 20 are fixed to each other. In other embodiments, the control module 70 and the base portion 10 could also be fixed to each other. Moreover, in other embodiments, when the first pivot shaft 52 is located between the base portion 10 and the second linkage 40, between the second linkage 40 and the movable portion 20, or between the movable portion 20 and the first linkage 30, the control module 70 is fixed relative to the base portion 10, the movable portion 20, the first linkage 30, or the second linkage 40 adjacent to the first pivot shaft 52.

In summary, the electronic derailleur 100 of the present disclosure houses the battery assembly 60 through the battery cavity 522 of the first pivot shaft 52, which not only achieves the effective integration of the battery assembly 60 but also effectively reduces the influence of external impacts on the battery assembly 60. Since the circuit board 74 is located at one end of the battery assembly 60 and the charging interface 76 is located adjacent to the battery assembly 60, a current transmission distance is effectively shortened, thereby reducing current loss and further enhancing charging efficiency and system performance.

It must be pointed out that the embodiments described above are only some preferred embodiments of the present disclosure. All equivalent structures which employ the concepts disclosed in this specification and the appended claims should fall within the scope of the present disclosure.

What is claimed is:

1. An electronic derailleur, mounted on a frame of a bicycle, comprising:

a base portion, configured to connect to the frame of the bicycle;

a movable portion, movable relative to the base portion;

a first linkage, pivotally connected to the base portion and the movable portion;

a second linkage, pivotally connected to the base portion and the movable portion, wherein the base portion, the movable portion, the first linkage, and the second linkage are pivotally connected as a four-bar linkage for moving the movable portion relative to the base portion;

four pivot shafts, located between the base portion and the second linkage, between the second linkage and the movable portion, between the movable portion and the first linkage, and between the first linkage and the base portion, respectively, wherein one of the four pivot shafts has a battery cavity; and a battery unit, disposed in the battery cavity.

2. The electronic derailleur as claimed in claim 1, wherein the pivot shaft having the battery cavity is defined as a first pivot shaft, and the first pivot shaft is located between the base portion and the second linkage, or between the first linkage and the base portion.

3. The electronic derailleur as claimed in claim 1, wherein the pivot shaft having the battery cavity is defined as a first pivot shaft, the first pivot shaft is a tubular body and has the battery cavity formed therein, and the battery cavity has an opening.

4. The electronic derailleur as claimed in claim 1, further comprising a control module, wherein the control module is electrically connected to the battery unit; the pivot shaft having the battery cavity is defined as a first pivot shaft; the control module is relatively fixed to the base portion, the movable portion, the first linkage, or the second linkage adjacent to the first pivot shaft.

5. The electronic derailleur as claimed in claim 4, wherein the control module comprises a casing, a circuit board, and a charging interface; the casing encases the circuit board; the circuit board is electrically connected to the battery unit; an end of the charging interface is connected to the circuit board, and another end of the charging interface passes through the casing to be exposed outward.

6. The electronic derailleur as claimed in claim 5, wherein the first pivot shaft is disposed between the first linkage and the base portion, and the first pivot shaft and the control module are positioned at the first linkage.

7. The electronic derailleur as claimed in claim 5, further comprising a battery assembly, wherein the battery assembly comprises a battery housing and the battery unit; the battery housing is disposed in the battery cavity of the first pivot shaft; the battery unit is disposed in the battery housing; an end of the battery housing has an end cap protruding from an opening of the battery cavity; the casing of the control module has a perforation; the end cap of the battery housing is secured in the perforation.

8. The electronic derailleur as claimed in claim 7, wherein the end cap has a terminal opening for a terminal of the battery unit to be exposed outward; the circuit board comprises a contact for being connected to the terminal of the battery unit.

9. The electronic derailleur as claimed in claim 6, wherein a first pivoting ring and a second pivoting ring are disposed coaxially at an end of the base portion adjacent to the first linkage; a third pivoting ring and a fourth pivoting ring are disposed coaxially at an end of the first linkage adjacent to the base portion; the first pivot shaft is disposed in the first pivoting ring, the second pivoting ring, the third pivoting ring, and the fourth pivoting ring.

10. The electronic derailleur as claimed in claim 9, wherein the first pivot shaft has a positioning portion, and the positioning portion is disposed between the third pivoting ring of the first linkage and the control module; the electronic derailleur comprises at least one positioning member for fixing the control module and the first linkage to each other.

11. The electronic derailleur as claimed in claim 9, wherein the first pivot shaft has a stop member, and the stop member is configured to limit a displacement of the first pivot shaft relative to the first pivoting ring, the second pivoting ring, the third pivoting ring, or the fourth pivoting ring.

* * * * *